Figure 1:
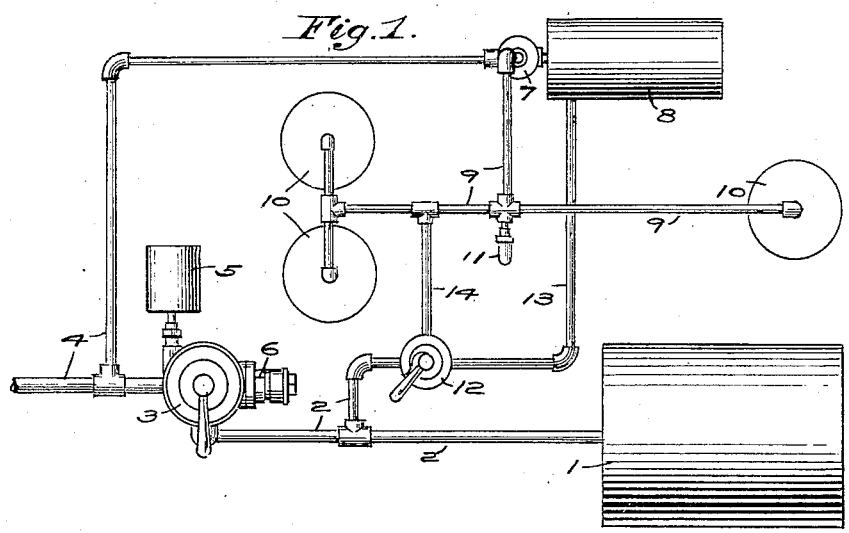

No. 863,823. PATENTED AUG. 20, 1907.
E. A. WRIGHT.
COMBINED AUTOMATIC AND STRAIGHT AIR BRAKE.
APPLICATION FILED DEC. 19, 1904.

WITNESSES
J. S. Custer
J. B. MacDonald.

INVENTOR
Edward A. Wright

UNITED STATES PATENT OFFICE.

EDWARD A WRIGHT, OF EDGEWOOD PARK, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

COMBINED AUTOMATIC AND STRAIGHT AIR BRAKE.

No. 863,823.      Specification of Letters Patent.      Patented Aug. 20, 1907.

Application filed December 19, 1904. Serial No. 237,360.

*To all whom it may concern:*

Be it known that I, EDWARD A. WRIGHT, a citizen of the United States, residing in Edgewood Park, county of Allegheny, and State of Pennsylvania, have invented a certain new and useful Improvement in a Combined Automatic and Straight Air Brake, of which the following is a specification.

This invention relates to fluid pressure brakes, and has for its object to provide an improved combined automatic and straight air brake apparatus adapted to be applied to locomotives, whereby the brakes on the locomotive may be controlled independently of the automatic train brakes when desired.

In the operation of trains, it is desirable to be able to apply the automatic brakes on both the locomotive and train in the usual way by the manipulation of the engineer's brake valve and to then release the driver or engine brakes while leaving the automatic train brakes applied; then to apply the engine brakes with straight air and to release the automatic train brakes for the purpose of recharging the auxiliary reservoirs, and to apply and control the engine brakes with straight air independently of the automatic brake system.

With the present standard automatic and straight air brake equipment for locomotives a straight air brake valve is used for supplying air from the main reservoir to the brake cylinders and for releasing the same therefrom, and a double check valve is employed at the junction of the straight air pipe with the pipe leading from the triple valve to the brake cylinders, but with this construction, when the brakes are applied on both engine and train by the automatic system, the engine or driver brakes cannot be released without also releasing the automatic train brakes, and the two systems of brakes cannot be controlled independently.

This invention comprises, in addition to the usual automatic equipment, a straight air brake valve having connections for supplying air from a source of higher pressure, such as the main reservoir, to the auxiliary reservoir and from thence through the triple valve to the brake cylinder, thereby securing the function of a straight air brake since, under the increase in the auxiliary reservoir pressure, the triple valve is moved to service application position and whatever amount of air is admitted to the auxiliary reservoir in excess of the train pipe pressure will be supplied to the brake cylinder through the service port of the triple valve; then as the auxiliary reservoir pressure diminishes to a point equal to or slightly below that of the train pipe the triple valve operates according to its usual function and moves to lap and closes the brake cylinder admission port. The engine brakes may then be released by venting a little air under pressure from the auxiliary reservoir by means of the straight air brake valve and thereby cause the movement of the triple valve of the driver brake to release position, or the said straight air brake valve may be provided with an additional release port connected directly to the brake cylinder, whereby the air pressure in the driver brake cylinders may be released or graded down as desired, independently of the automatic brake system.

Figure 2:
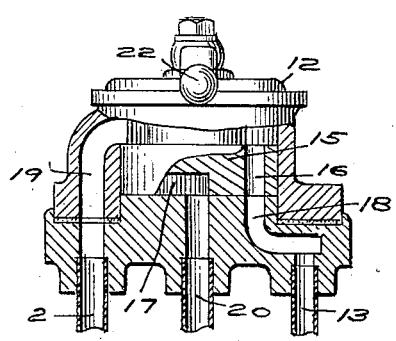
Figure 3:
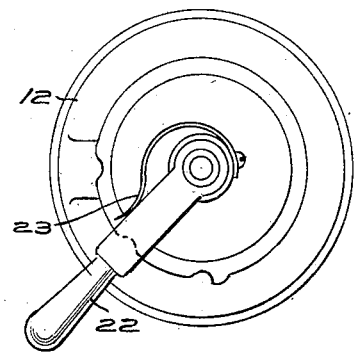
Figure 4:
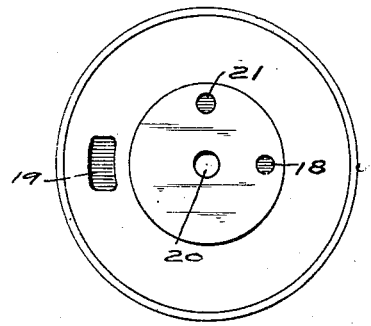
Figure 5:
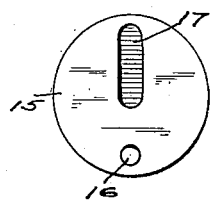

In the accompanying drawing; Figure 1 shows a diagrammatic plan view of a combined automatic and straight air brake equipment embodying my invention; Fig. 2 a vertical sectional view of the straight air brake valve; Fig. 3 a plan view of the same; Fig. 4 a plan view of the valve seat; and Fig. 5 a face view of the rotary valve of the straight air brake valve.

According to the construction shown, the equipment comprises a main reservoir 1, main reservoir pipe 2, engineer's brake valve 3, having equalizing reservoir 5 and feed valve 6, train pipe 4, triple valve 7, auxiliary reservoir 8, brake cylinder pipe 9, and brake cylinders 10, all of which may be of the usual standard construction of an automatic air brake system. According to my improvement, I provide in addition to this standard automatic equipment a straight air brake valve 12 having a connection with the main reservoir pipe 2, and also connected by means of pipe 13 with the auxiliary reservoir, and by pipe 14 with the brake cylinder pipe 9.

Any desired form of straight air brake valve may be used, that shown being of the rotary type, comprising a casing having a port 19 for connecting the main reservoir pipe with the valve chamber containing the rotary valve 15. In the valve seat are located the application port 18 leading to pipe 13 and the auxiliary reservoir, the port 21 leading to the pipe 14 and directly to the brake cylinders, and the exhaust port 20, while the rotary valve 15 is provided with a through port 16 and a cavity 17. Means, such as a spring 23, may be provided, if desired, for normally returning the straight air brake valve handle 22 from release position to lap position, as indicated in Fig. 3.

The operation of my improvement is as follows:—
With the straight air brake valve in its normal lap position, as indicated in Fig. 3, the port 21 leading from the engine brake cylinders is closed, as is also the application port 18. The automatic brake system of both the locomotive and train may be then controlled by the automatic engineer's brake valve in the usual way.

With the automatic engineer's brake valve in running position, and all the brakes released, the engine or driver brakes may be applied by turning the straight air brake valve to application position, in which the port 16 in the rotary valve 15 registers with port 18. Air under pressure from the main reservoir then flows through pipe 13 to the auxiliary reservoir 8 and, raising the pressure therein above that of the train pipe, causes the triple valve to move to service position, thereby opening communication from the auxiliary reservoir to the brake cylinder. Air then flows to the brake cylinder at substantially the same rate that it is admitted from the main reservoir to the auxiliary reservoir, and when the straight air brake valve is turned back to lap position, the auxiliary reservoir pressure continues to reduce to the brake cylinder until slightly below that of the train pipe when the triple valve moves to lap in the usual way, thereby cutting off further admission of air to the brake cylinder. In the meantime, if the automatic engineer's brake valve remains in its normal running position the train pipe will be maintained at normal standard pressure by means of the feed valve so that both the train pipe and auxiliary reservoir remain fully charged and it is substantially only the same amount of air that is admitted from the main reservoir to the auxiliary reservoir that passes through the triple valve to the brake cylinder. It will therefore be seen that the triple valve operates according to its usual function, with the exception that it is actuated by an increase in auxiliary reservoir pressure instead of a reduction in train pipe pressure. In this manner the engine brakes may be graded up to any degree of pressure desired, limited only by the safety valve 11. The engine brakes may then be released or graded down, as desired, by turning the straight air brake valve to release position, in which the cavity 17 in the rotary valve 15 establishes communication from the brake cylinder pipe 14 and port 21 to the exhaust port 20. After the engine brakes are released by means of the straight air brake valve this valve is turned to lap position in order to close the brake cylinder exhaust in readiness for an application by the automatic system at any time.

A spring 23, or other means, may be provided for automatically returning the handle of the straight air brake valve from release to lap position in case the engineer should inadvertently leave the same in release position.

Another way of securing a full release of the engine brakes is to turn the straight air brake valve to a further position in which the cavity 17 connects ports 18 and 20, thereby making a momentary reduction of the auxiliary reservoir pressure to the atmosphere, which will cause the instant movement of the triple valve to release position and open the brake cylinder exhaust through the triple valve, the straight air brake valve being immediately turned back to lap position.

If the engine brakes are released by opening the direct exhaust through the straight air brake valve the triple valve may be left standing in lap position, but this will have no undesirable effect. If the brakes on both engine and train are applied by the automatic system in the usual way, the engine brakes may then be released independently of the train brakes by manipulating the straight air brake valve in either of the ways above described, and may afterwards be re-applied with straight air at any time.

By means of my improvement including the connection from the straight air brake valve to the auxiliary reservoir, all additional devices for closing the triple valve exhaust when applying the brakes with straight air are dispensed with, and it will now be apparent that I have provided a very simple and efficient combined automatic and straight air brake equipment, whereby the automatic train brakes and engine brakes may be operated together or independently, as desired, while at the same time the automatic emergency action may be secured at any time, even though the engine brakes are applied with the straight air.

Having now described my invention, what I claim as new and desire to secure by Letters Patent is:—

1. A combined automatic and straight air brake apparatus for locomotives, comprising a main reservoir, engineer's brake valve, train pipe, a driver brake triple valve, auxiliary reservoir, and brake cylinder, and an independent brake valve adapted to control a supply of air from the main reservoir to the driver brake auxiliary reservoir.

2. A combined automatic and straight air brake apparatus for locomotives, comprising a main reservoir, engineer's brake valve, train pipe, a driver brake triple valve, auxiliary reservoir, and brake cylinder, and an independent brake valve having ports and connections for supplying air from the main reservoir directly to the driver brake auxiliary reservoir for actuating the triple valve.

3. A combined automatic and straight air brake apparatus for locomotives, comprising a main reservoir, engineer's brake valve, train pipe, a driver brake triple valve, auxiliary reservoir, and brake cylinder, and an independent brake valve having ports for controlling communication from the main reservoir to the driver brake auxiliary reservoir, and from said auxiliary reservoir to the atmosphere for actuating the driver brake triple valve.

4. A combined automatic and straight air brake apparatus for locomotives, comprising a main reservoir, engineer's brake valve, train pipe, a driver brake triple valve, auxiliary reservoir, and brake cylinder, and an independent brake valve adapted to control a supply of air to the driver brake auxiliary reservoir, and a direct release from the driver brake cylinder.

5. A combined automatic and straight air brake apparatus for locomotives, comprising a main reservoir, engineer's brake valve, train pipe, a driver brake triple valve, auxiliary reservoir, and brake cylinder, and an independent brake valve having ports for controlling a supply of air to the driver brake auxiliary reservoir, and to the driver brake cylinder.

6. A combined automatic and straight air brake apparatus, comprising a main reservoir, engineer's brake valve, train pipe, triple valve, auxiliary reservoir, brake cylinder, and an independent brake valve adapted to control the supply of air from the main reservoir to the auxiliary reservoir for actuating the triple valve, and the release from the brake cylinder to the atmosphere.

7. In a fluid pressure brake, the combination with an automatic air brake system having main reservoir, train pipe, auxiliary reservoir, triple valve, and brake cylinder, of an independent brake valve having ports and connections for supplying air from the main reservoir directly to the auxiliary reservoir for actuating the triple valve, and other ports for controlling the release from the brake cylinder.

8. In a fluid pressure brake, the combination with a train pipe, auxiliary reservoir, triple valve, and brake cylinder on the engine, of a straight air brake valve having means for increasing and reducing the pressure in the auxiliary reservoir for actuating the triple valve to supply air to the brake cylinder and release the same from the brake cylinder.

9. In a fluid pressure brake, the combination with a train pipe, auxiliary reservoir, triple valve, and brake cylinder, of a straight air brake valve having ports and connections for increasing the pressure upon the auxiliary reservoir side of the triple valve and for supplying air to the brake cylinder.

In testimony whereof I have hereunto set my hand.

EDWARD A. WRIGHT.

Witnesses:
R. F. EMERY,
J. B. MACDONALD.